(12) United States Patent
Walker

(10) Patent No.: US 9,788,487 B2
(45) Date of Patent: Oct. 17, 2017

(54) ROW UNIT OF A CORN HEADER HAVING A DECK PLATE WITH A STRUCTURED SURFACE

(71) Applicant: CNH Industrial America LLC, New Holland, PA (US)

(72) Inventor: Eric L. Walker, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 64 days.

(21) Appl. No.: 14/876,050

(22) Filed: Oct. 6, 2015

(65) Prior Publication Data

US 2017/0094905 A1    Apr. 6, 2017

(51) Int. Cl.
| | |
|---|---|
| *A01D 45/02* | (2006.01) |
| *A01D 45/10* | (2006.01) |
| *A01D 57/22* | (2006.01) |
| *A01D 75/02* | (2006.01) |
| *A01D 101/00* | (2006.01) |

(52) U.S. Cl.
CPC .......... *A01D 45/021* (2013.01); *A01D 57/22* (2013.01); *A01D 75/02* (2013.01); *A01D 2101/00* (2013.01)

(58) Field of Classification Search
CPC .... A01D 45/021; A01D 65/00; A01D 45/023; A01D 45/025; A01F 11/06
See application file for complete search history.

(56) References Cited

U.S. PATENT DOCUMENTS

| | | | | |
|---|---|---|---|---|
| 1,970,797 | A | * | 8/1934 | Coultas .................. A01F 11/06 460/31 |
| 3,225,528 | A | * | 12/1965 | Gray ...................... A01D 46/08 56/50 |
| 4,845,930 | A | | 7/1989 | Dow |
| 5,195,309 | A | | 3/1993 | Mossman |
| 5,704,202 | A | | 1/1998 | Calmer |
| 5,809,759 | A | * | 9/1998 | Zyla ..................... A01D 45/003 56/220 |
| 6,032,445 | A | | 3/2000 | Heintzman |
| 6,370,853 | B1 | | 4/2002 | Randall et al. |
| 6,625,969 | B2 | | 9/2003 | Glazik |
| 7,073,316 | B2 | | 7/2006 | Resing et al. |
| 7,373,767 | B2 | | 5/2008 | Calmer |

(Continued)

FOREIGN PATENT DOCUMENTS

| | | | | |
|---|---|---|---|---|
| CN | 203675641 U | * | 7/2014 | ............ A01D 45/02 |
| EP | 1491083 A2 | | 12/2004 | |

(Continued)

OTHER PUBLICATIONS

European Search Report for European Application No. 16192188.7 dated Feb. 8, 2017 (7 pages).

*Primary Examiner* — Árpád Fábián-Kovács
(74) *Attorney, Agent, or Firm* — Peter K. Zacharias; Patrick M. Sheldrake

(57) ABSTRACT

A deck plate of a corn header row unit capable of reducing grain loss is provided. The deck plate includes forward and rear ends, a top surface, a medial side having a depending portion, and a mounting side opposite the medial side for connecting to a portion of the row unit. Structures are positioned about the top surface spaced from the medial side and configured to inhibit a flow of grain. The structures can be formed as one or more of a variety of shapes that include corrugations, ribs, recesses or protrusions.

20 Claims, 5 Drawing Sheets

(56) References Cited

U.S. PATENT DOCUMENTS

| | | | |
|---|---|---|---|
| 7,874,134 B1 | | 1/2011 | Hoffman |
| 7,913,480 B2 | | 3/2011 | Christensen et al. |
| 8,196,380 B2 | * | 6/2012 | Carboni ............... A01D 45/021 |
| | | | 56/62 |
| 8,196,381 B2 | | 6/2012 | Herman et al. |
| 8,286,410 B2 | | 10/2012 | Priepke et al. |
| D697,535 S | * | 1/2014 | Walker ........................... D15/28 |
| D697,944 S | * | 1/2014 | Walker ........................... D15/28 |
| D739,881 S | * | 9/2015 | Walker ........................... D15/28 |
| 9,179,601 B2 | * | 11/2015 | Walker ................ A01D 45/021 |
| 2009/0183483 A1 | * | 7/2009 | Herman ................ A01D 41/12 |
| | | | 56/207 |
| 2011/0138764 A1 | * | 6/2011 | Herman ................ A01D 45/22 |
| | | | 56/207 |
| 2012/0204528 A1 | | 8/2012 | Regier |
| 2014/0150394 A1 | * | 6/2014 | Calmer ................ A01D 45/021 |
| | | | 56/106 |
| 2014/0237975 A1 | | 8/2014 | Walker |
| 2014/0298769 A1 | | 10/2014 | Walker et al. |

FOREIGN PATENT DOCUMENTS

| | | |
|---|---|---|
| WO | 2015009797 A1 | 1/2015 |
| WO | 2015085161 A1 | 6/2015 |

\* cited by examiner ically bent deck plates with corrugations, a combination of bent deck plates

ROW UNIT OF A CORN HEADER HAVING A DECK PLATE WITH A STRUCTURED SURFACE

BACKGROUND

The subject application relates generally to corn headers for use with combine harvesters. In particular, the subject application relates to an improved corn header having a row unit with deck plates, also commonly known as a stripping plates that include a structured surface to inhibit the loss of grain during harvesting operations.

An agricultural combine is a machine used to harvest a variety of crops from a field. During a harvesting operation, a corn header at the front of the combine cuts ripened crop from the field. A feederhouse downstream the corn header transfers the crop material to the downstream processes of the combine. Threshing and separating assemblies within the combine remove grain from the crop material and transfers the grain to a grain tank for temporary holding. Crop material other than grain (MOG) exits from the rear of the combine.

Combines that harvest corn are provided with a corn header having row dividers for directing rows of corn stalks to row units that include ear separation chambers or stripping plates and then to an auger for conveying the corn to a feederhouse of the combine. Conventional corn head assemblies have deck plates which allow harvested corn and associated grain to slide rearwardly into the rear of corn header for subsequent processing. These smooth stripping or deck plates, however, also allow for harvested corn and associated grain to slide in a non-desired direction and onto the ground when insufficient crop material is processed through the corn header, such as when the combine passes through an area of poor crop density or an end of a harvesting row. This phenomena leads to a loss of harvested crop material and ultimately an economic loss.

Thus, there is still a need for a row unit having deck plates that addresses the foregoing deficiencies in conventional corn header systems. This need is satisfied by the subject application of a deck plate for a row unit of an agricultural harvester corn header having a structured surface to inhibit the flow of grain.

BRIEF SUMMARY

In accordance with a preferred embodiment, the subject application provides a row unit of a corn header for an agricultural harvester that includes a frame, first and second row unit arms mounted to the frame, and a deck plate mounted to each of the row unit arms. The deck plates are spaced apart such that a gap is defined between the first and second deck plates. Each of the first and second deck plates includes a plurality of structures configured to inhibit a flow of grain, thus minimizing grain loss.

In accordance with a second aspect, the subject application provides a deck plate of a row unit of a corn header for an agricultural harvester. The deck plate includes an elongated body with a forward end, a rear end and a top surface. A medial side of the deck plate has a depending portion, while a mounting side of the deck plate opposite the medial side enables connection to a portion of the row unit. A plurality of structures are positioned about the top surface of the deck plate, spaced from its medial side and configured to inhibit a flow of grain, thus minimizing grain loss.

In accordance with a third aspect, the subject application provides a variety of structures for a deck plate of a corn header row unit that are advantageously shaped and sized to catch loose grain during a harvesting operation, thus minimizing grain loss sliding off the deck plates. The structures can be configured as corrugations, ribs, recesses or protrusions. The grain retaining and redirecting abilities of the structures is increased by providing each recess among the structures with a depth at least slightly greater than a diameter of a corn kernel, and by sloping the bottom surface of each recess.

In accordance with another, the subject application provides a deck plate with raised or recessed areas that trap and hold grain such that the grain does not fall off the edge of the deck plate. The depressions would not interfere with the normal flow of material, but would halt or lessen the flow in the non-desired direction. The corrugations would not interfere with the stripping action of the deck plate, nor would they compound the impact shelling of grain along the deck plate.

The current construction of deck plates includes a flat plate with about a 20 degree bend down about 20 mm from the working edge. The bend down helps distribute the impact force over a larger area thus reducing damage to the ear. There is also a flat deck plate which does not bend down along the working edge. The corrugations would be placed such that they are inboard of the working edge sufficiently to not interfere with the distribution of impact forces. The corrugations would likely look more like small depressions with tapered bottoms such that the tapered bottom raises to zero at the rear and forms a small pocket the thickness of a flat kernel, about 4 mm. The depth of the depression would be deep enough to impair the forward sliding movement of grain, but not the rearward movement. The depression would also be shallow enough and shaped such that the sweeping action of the gather chain paddles tends to keep the pockets clean.

When corn ears are stripped from the stalk, the impact force causes kernels to be shelled from the ear. These kernels are then vulnerable to loss through the opening between the deck plates. When the crop is harvested early there is generally enough material to sweep the lose kernels rearward and into the auger. As the season wears on or imperfect stands are encountered less material is brought into the head, thus allowing grain to be lost through the deck plates. The corrugations work by providing a passive capture of the grain. So, if a kernel is not captured by the gather chain and plant material and is sliding forward, down and away from the auger, the corrugations would impede its flow and capture it until either a gather chain paddle or piece of plant material can sweep it into the auger. Also, when the head comes to the end of the row, or is shut off, the corrugations would provide a secure resting place for free grain. Then when the header reenters the crop or is restarted the saved kernels can be swept reward and into the header's auger.

Corrugations could extend above the level of the deck plates. Corrugations could be simple cut outs in the deck plate with a backer plate beneath them to support the grain. Deck plates and corrugations could be made of plastic or another composite material. The corrugations could be directly attached to the flat surface of a deck plate. The corrugations could be of many different shapes including round fish scales, square indentations or triangular impressions or even a piece of sand paper type traction material or carpet or brush bristles.

The present invention provides for raised or lowered portions of the deck plate, i.e., a combination of flat deck plates with corrugations, a combination of bent deck plates with corrugations, or a combination of rodded or raised edge deck plates with corrugations.

BRIEF DESCRIPTION OF THE SEVERAL VIEWS OF THE DRAWINGS

The foregoing summary, as well as the following detailed description of the preferred embodiments of the subject application, will be better understood when read in conjunction with the appended drawings. For the purpose of illustrating the invention, there are shown in the drawings embodiments that are presently preferred. It should be understood, however, that the subject application is not limited to the precise arrangements and instrumentalities shown.

In the drawings.

DETAILED DESCRIPTION

Reference will now be made in detail to the preferred embodiments of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "tailing," and "crop material" are used throughout the specification for convenience and it should be understood that these terms are not intended to be limiting. Thus, "grain" refers to that part of a crop that is harvested and separated from discardable portions of the crop material.

"About" as used herein when referring to a measurable value such as an amount, a temporal duration, and the like, is meant to encompass variations of ±20%, ±10%, ±5%, ±1%, or ±0.1% from the specified value, as such variations are appropriate to perform the disclosed methods.

Figure 1:
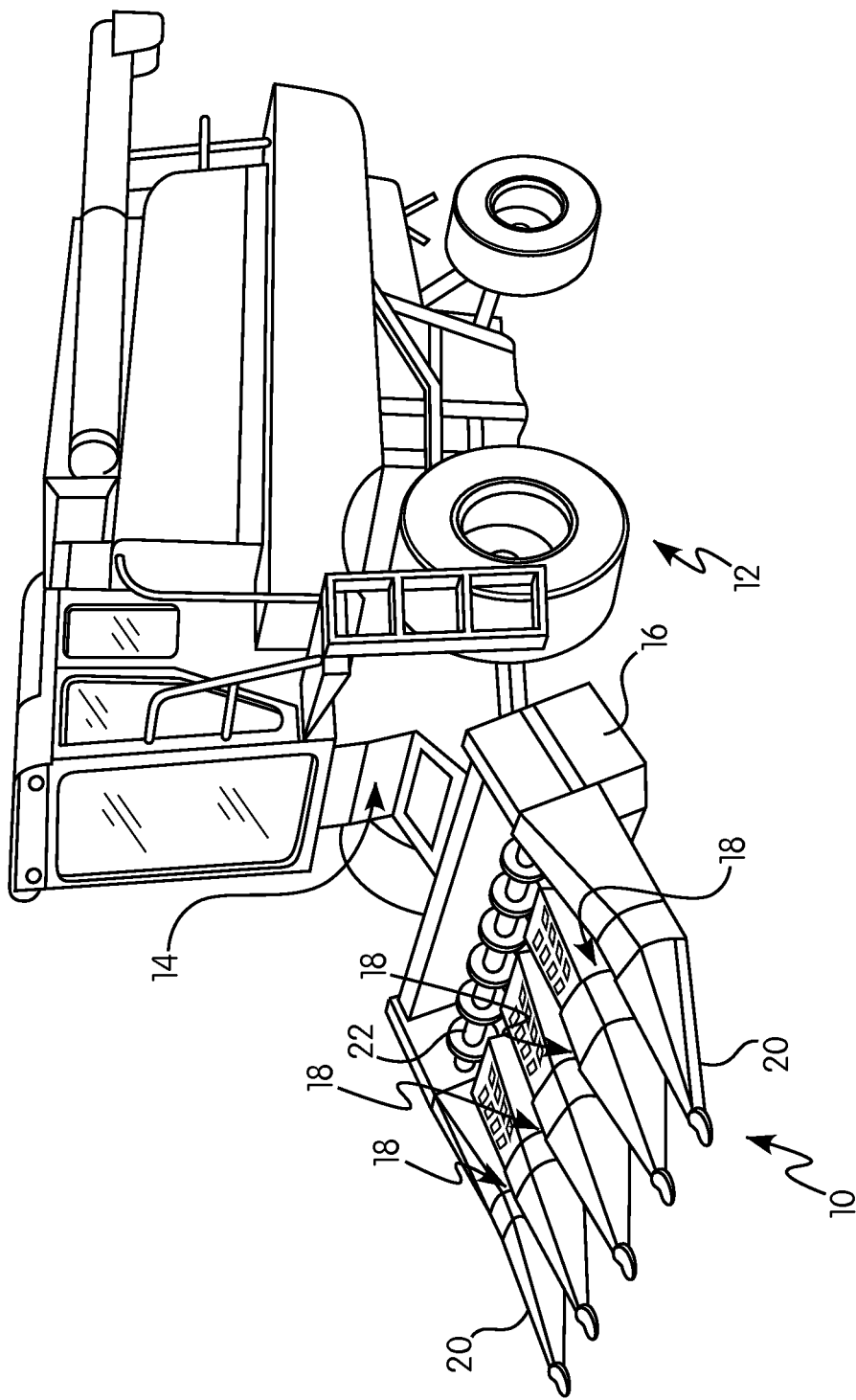
FIG. 1 is a perspective view of an agricultural combine that includes a corn header having a row unit in accordance with a preferred embodiment of the subject application.
Figure 2:
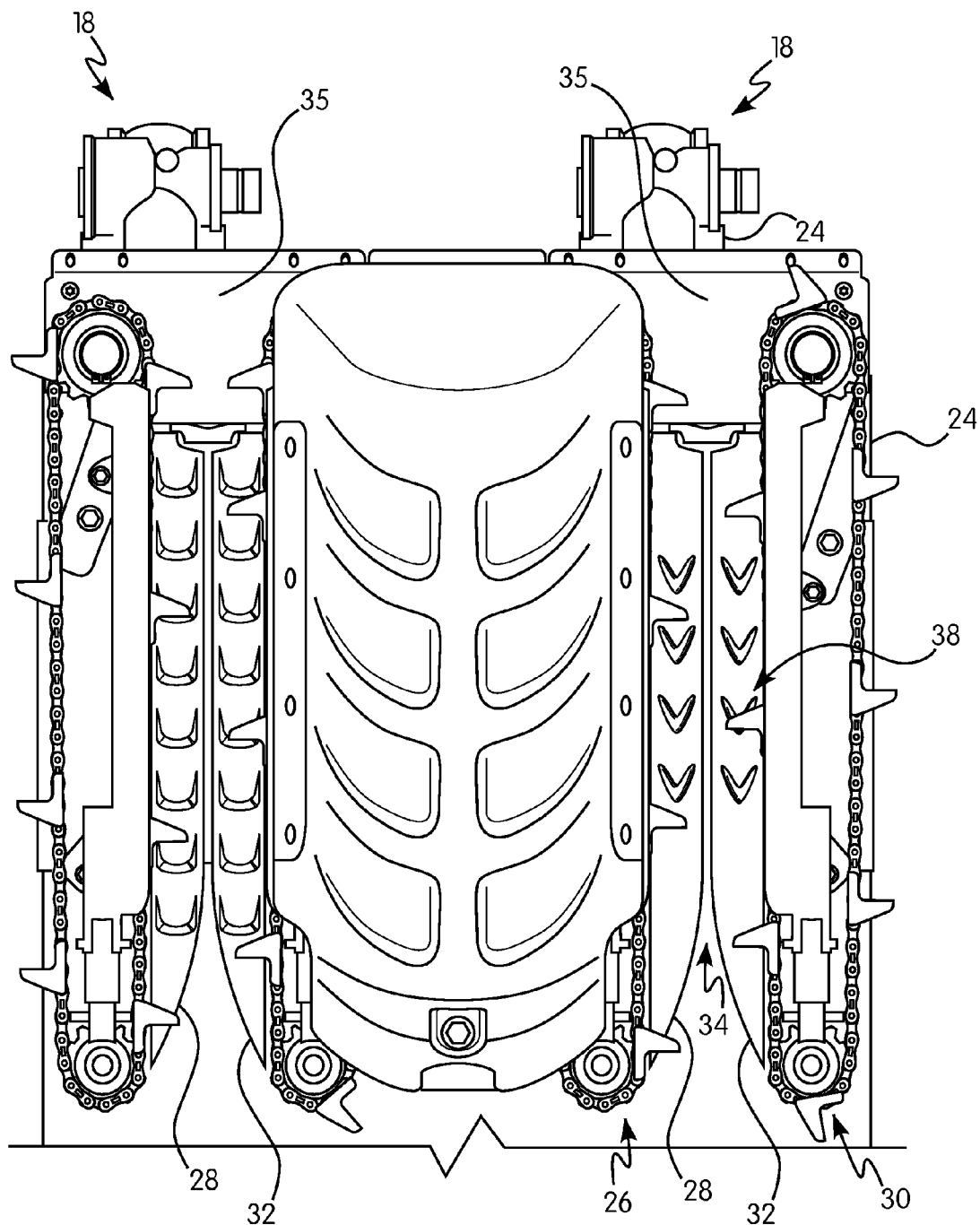
FIG. 2 is top plan view of a row unit in accordance with a preferred embodiment of the subject application.

Referring now to the drawings, wherein preferred embodiments of the subject application are shown, FIGS. 1 and 2 illustrate a corn header 10 of the subject application as applied to an agricultural combine or combine harvester 12. The corn header 10 is shown operatively connected to the combine harvester 12 for harvesting corn and feeding the corn to a feederhouse 14.

The corn header 10 includes a header frame 16 for mounting to a forward end of the combine harvester 12, a plurality of row units 18 extending forward from the header frame 16 and a plurality of row dividers 20. Each row divider 20 is connected to and extends forward of at least one row unit 18.

Such feederhouses, row units, row dividers, and harvesting operations of the combine harvester are known in the art and a further detailed description of their structure, function and operation is not necessary for a complete understanding of the subject application. However, typical corn headers applicable to the subject application are disclosed in U.S. Pat. Nos. 8,286,410 and 6,370,853, the entire disclosures of which are incorporated by reference herein for all purposes. A variety of row dividers and row units also applicable to the subject application are disclosed in U.S. Pat. Nos. 5,195,309; 6,370,853; 6,625,969; 7,073,316; 7,913,480; 7,874,134 and 7,373,767 the entire disclosures of which are incorporated by reference herein for all purposes.

The corn header also includes a conveyor 22. The conveyor 22 conveys grain separated from the stalk by the row units 18 to the feederhouse 14 once the grain is received within a channel of the header below the conveyor 22. The conveyor 22 is connected to the header frame 16 about its side walls and is situated within the channel extending between the side walls of the header frame 16. As such, grain received within the channel is conveyed towards the feederhouse 14 by the conveyor 22. The conveyor 22 is positioned in front or above a combine feeding location and rearward of the row dividers 20.

In operation, crop material is stripped from the stalks as they are pulled within the row unit 18 and enter the gap 34 formed by the deck plates 28, 32. The stripped grain is then conveyed to the conveyor 22 owing to the flow of crop material in a rearward direction during harvesting operation. That is, the subsequent flow of crop material entering the row units 18 pushes/pulls the harvested crop material rearward towards the conveyor 22.

The row dividers 20 extend forwardly from the header frame 16 and are connected to the plurality of row units 18 for directing, e.g., a row of corn stalks towards the deck plates 28, 32 of the row unit 18. The row dividers 20 include a generally conical shaped nose 36. Such noses 36 of the row dividers 20 are known in the art and a further detailed description of their structure, function and operation is not necessary for a complete understanding of the subject application.

Each of the plurality of row units 18 is attached to the header frame 16 and extends in a forward direction from the header frame 16 and away from the combine harvester 12. Referring to FIG. 2, each row unit 18 includes a frame 24 that connects to the header frame 16. A first row unit arm 26 is mounted to and extends forward from the frame 24, and includes a first deck plate (or stripping plate) 28. A second row unit arm 30 is mounted to and extends forward from the frame 24, and includes a second deck plate 32. The first deck plate 28 and the second deck plate 32 are preferably elongated deck plates having a substantially planar top surface and are spaced apart defining an elongated gap 34 between them. Each deck plate 28, 32 has a substantially planar top surface (when not including the structures) and includes a forward end, and a rear end opposite the forward end and adjacent a top plate 35 of the row unit.

Each deck plate 28, 32 also includes a substantially planar top surface that extends continuously along a medial side 28*a*, 32*a* respectively, of each deck plate 28, 32. Depending from each medial side is a respective depending portion 35. Opposite the medial side of each deck plate is a mounting side 37 for connecting to a portion of the row unit. The planar top surface that extends continuously adjacent the medial side of the deck plate forms or defines a substantially planar impact zone 33.

Preferably the impact zone has a width of about one half a diameter of an ear of corn. In other words, the plurality of structures are positioned spaced from the medial side of the deck plates, and preferably spaced about a distance equal to one half a diameter of an ear of corn. That is, the plurality of structures are positioned along a region of the respective deck plates adjacent the substantially planar impact zone 33. The impact zone will reduce the impact force experienced by an ear of corn when it contacts the deck plates 28, 32, thus reducing the amount of grain dislodged and lost.

Referring to FIG. 2, the deck plates 28, 32 of the subject application include a plurality of structures 38 configured to inhibit a flow of grain. The structures 38 can be configured as a corrugation, an elongated corrugation, a rib, an elongated rib, a recess, an elongated recess, and/or a protrusion or elongated protrusion.

In accordance with an aspect of the present invention, the plurality of structures are aligned in a row extending from the forward end of the deck plate to a rear end of the deck plate.

Figure 3:
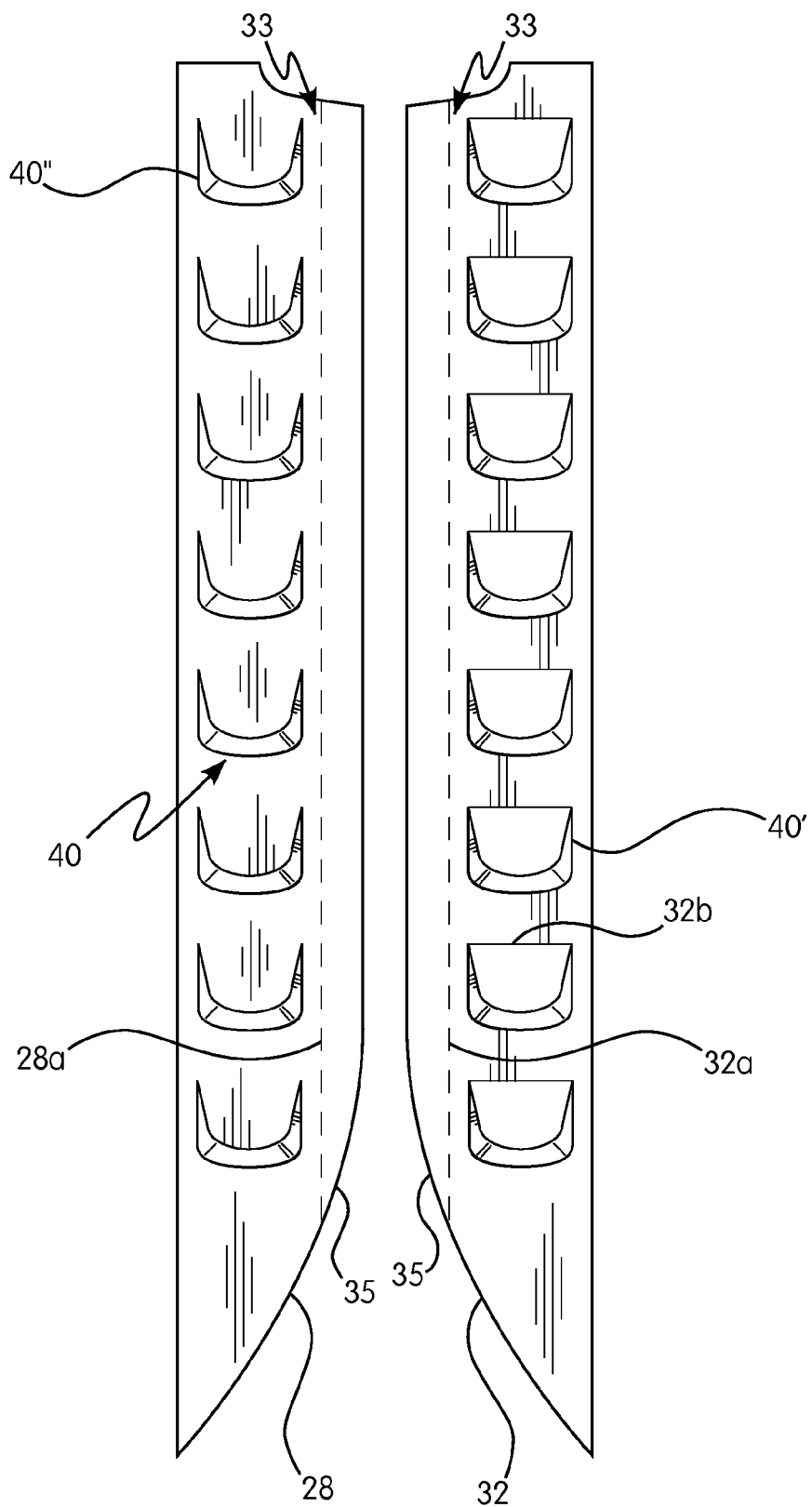
FIG. 3 is a top plan view of a pair of deck plates of the row unit of FIG. 2 in accordance with another aspect of the subject application.

As shown in FIGS. 2 and 3, the structures 38 are preferably configured as a horseshoe shaped structure 40 with the open top portion of the horseshoe shaped structure facing rearwardly. The horseshoe shaped structure can be an elongated protrusion 40" or an elongated recess 40'. When configured as a horseshoe shaped recess 40', the recess includes a sloped floor or sloped bottom surface 40*a* that extends from a top surface e.g., top surface 32*b* of the deck plate 32. In other words, the horseshoe shaped recess 40' includes a tapered bottom surface. The sloped floor 40*a* connects to the top surface about a posterior end of the structure. When so configured, the horseshoe shaped structure can also be configured to have a substantially planar front wall 40*b* i.e., an anterior wall. Preferably, the front wall 40*b* is a substantially vertical wall.

Figure 4:
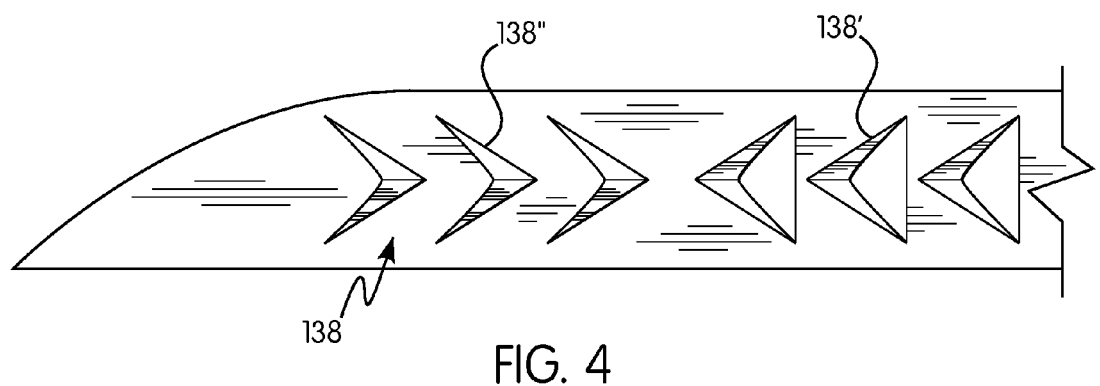
FIG. 4 is a top plan view of a deck plate of the row unit of FIG. 2 in accordance with yet another aspect of the subject application.
Figure 5:
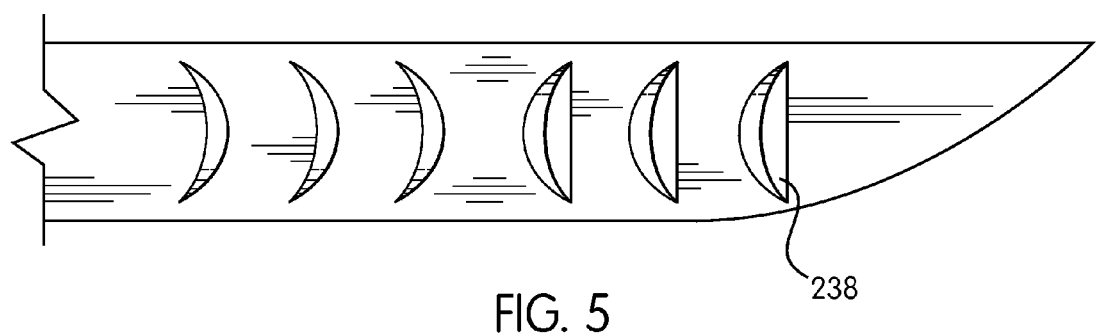
FIG. 5 is a top plan view of a deck plate of the row unit of FIG. 2 in accordance with another aspect of the subject application.
Figure 6:
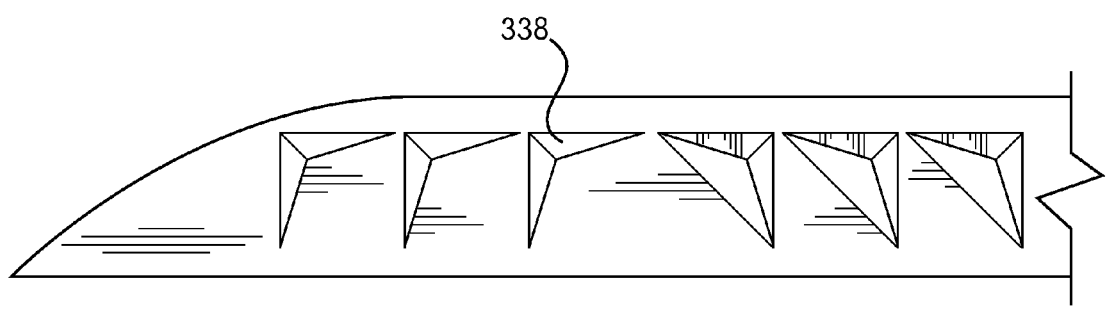
FIG. 6 is a top plan view of a deck plate of the row unit of FIG. 2 in accordance with yet another aspect of the subject application.

As shown in FIGS. 4-6, the structures 38 can alternative be configured as an arrow shaped or boomerang shaped or V-shaped structure 138, a crescent shaped structure 238 or a substantially L-shaped structure 338. Each of these preferred shapes of the structures can either be configured as a recess or a protrusion. When in the substantially L-shaped configuration 338, one leg of the "L" extends substantially transverse to a longitudinal axis of the deck plate, while the other leg preferably extends rearwardly from a medial side of the substantially transverse leg so as to further hinder or block the flow of grain in a direction towards the gap 34.

Each structure can be arranged on the deck plate and aligned so as to be in the same orientation, as shown in FIG. 3 for the horseshoe shaped structures 40. Alternatively, the structures can be arranged on the deck plates so as to alternate its configuration. For example, as shown in FIG. 4, the arrowhead shaped structures 138 about the forward end of the deck plate is arranged to point rearwardly while the arrowhead shaped structures 138 about the rear end of the deck plate is arranged to point forwardly. Additionally, the plurality of structures arranged on an individual deck plate can be arranged to alternate between recessed protrusions, such as arrowhead shaped protrusions 138', and arrowhead shaped recesses 138".

The structures may be produced in the deck plates by any of several conventional metalworking processes including stamping, drawing, or mechanically attached by fasteners or welding, or the like.

Figure 7:
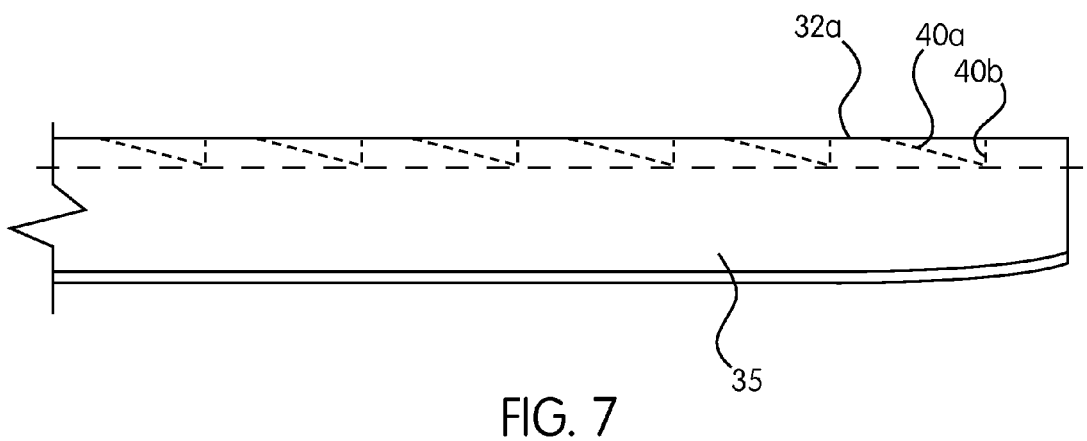
FIG. 7 is a side view of a deck plate of the row unit of FIG. 2 in accordance with another aspect of the subject application.

When the structures are formed as recesses, they are preferably configured to have a depth at least slightly greater than a diameter of a corn kernel to facilitate retaining or inhibiting the flow of loose grain. For example, the depth of a recessed structure can be at least 3 mm, but can alternatively be more than or less than 3 mm, such 2, 2.5, 3.5, 4, 5, 6 or more millimeters in depth from a top surface of the deck plate. The recessed structures are also preferably configured as inset recessed structures, as shown for example in FIG. 7.

It will be appreciated by those skilled in the art that changes could be made to the embodiments described above without departing from the broad inventive concept thereof. For example, alternative shapes and sizes for the plurality of deck plate structures described in the foregoing can be used. It is to be understood, therefore, that the subject application is not limited to the particular embodiment disclosed, but it is intended to cover modifications within the spirit and scope of the subject application as defined by the appended claims.

I claim:

1. A row unit of a corn header for an agricultural harvester comprising:
    a frame;
    a first row unit arm mounted to the frame, the first row unit arm including a first deck plate; and
    a second row unit arm mounted to the frame, wherein the second row unit arm includes a second deck plate spaced from the first deck plate defining a gap therebetween,
    wherein each of the first and second deck plates includes a plurality of structures configured to inhibit a flow of grain,
    wherein the plurality of structures of the first deck plate are positioned spaced from a medial side of the first deck plate, and
    wherein the plurality of structures of the second deck plate are positioned spaced from a medial side of the second deck plate.

2. The row unit of claim 1, wherein each of the plurality of structures is configured as a corrugation, a rib, a recess or a protrusion.

3. The row unit of claim 2, wherein each recess of the plurality of structures has a depth at least slightly greater than a diameter of a corn kernel.

4. The row unit of claim 3, wherein each recess of the plurality of structures has a depth of at least 3 mm.

5. The row unit of claim 1, wherein each of the first and second deck plates is an elongated deck plate having a substantially planar top surface, and wherein each structure is a recess having a sloped bottom surface extending from the top surface.

6. The row unit of claim 5, wherein each structure is inset into a respective one of the first and second deck plates and includes a substantially planar front wall and a tapered bottom surface.

7. The row unit of claim 1, wherein each of the plurality of structures comprises a horse shoe shaped structure, a V-shaped structure, an L-shaped structure, or a crescent shaped structure.

8. The row unit of claim 1, wherein each of the plurality of structures is configured as an elongated corrugation, an elongated rib, an elongated recess or an elongated protrusion.

9. The row unit of claim 1, wherein each of the first and second deck plates is an elongated deck plate having a forward end and a rear end, and wherein the plurality of structures of the first deck plate are aligned in a row extending from the forward end to the rear end of the first deck plate, and wherein the plurality of structures of the second deck plate are aligned in a row extending from the forward end to the rear end of the second deck plate.

10. The row unit of claim 1, wherein each of the first and second deck plates is an elongated deck plate having a substantially planar top surface extending continuously along the medial side of the deck plate defining a substantially planar impact zone, and wherein the plurality of structures of the first deck plate are positioned along a region of the first deck plate adjacent the substantially planar impact zone, and wherein the plurality of structures of the second deck plate are positioned along a region of the second deck plate adjacent the substantially planar impact zone.

11. The row unit of claim 1, wherein each of the first and second deck plates is an elongated deck plate.

12. The row unit of claim 1, wherein the plurality of structures of the first deck plate are positioned spaced from the medial side of the first deck plate about a distance equal to one half a diameter of an ear of corn, wherein the plurality of structures of the second deck plate are positioned spaced from the medial side of the second deck plate about a distance equal to one half a diameter of an ear of corn.

13. A deck plate of a row unit of a corn header for an agricultural harvester, comprising an elongated body that includes:

a forward end;
a rear end;
a top surface;
a medial side having a depending portion;
a mounting side opposite the medial side for connecting to a portion of the row unit; and
a plurality of structures positioned about the top surface spaced from the medial side and configured to inhibit a flow of grain.

14. The deck plate of claim 13, wherein each of the plurality of structures is configured as a corrugation, a rib, a recess or a protrusion.

15. The deck plate of claim 14, wherein each recess of the plurality of structures has a depth at least slightly greater than a diameter of a corn kernel.

16. The deck plate of claim 14, wherein each recess of the plurality of structures have a depth of at least 3 mm.

17. The deck plate of claim 13, wherein the top surface is a substantially planar top surface, and wherein each of the plurality of structures comprises a recess having a sloped bottom surface extending from the top surface.

18. The deck plate of claim 14, wherein the recess is inset into the deck plate and includes a substantially planar front wall depending from the top surface and a tapered bottom surface.

19. The deck plate of claim 13, wherein the plurality of structures includes a horse shoe shaped structure, V-shaped structure, an L-shaped structure, or a crescent shaped structure.

20. The deck plate of claim 13, wherein each of the plurality of structures is configured as an elongated corrugation, an elongated rib, an elongated recess or an elongated protrusion.

* * * * *